US005103072A

United States Patent [19]

Eikeland et al.

[11] Patent Number: 5,103,072

[45] Date of Patent: Apr. 7, 1992

[54] SUBMERSIBLE PLASMA TORCH

[75] Inventors: Inger J. Eikeland, Oslo; Per Poppe, Hovik, both of Norway

[73] Assignee: Elkem Technology a/s, Norway

[21] Appl. No.: 540,458

[22] Filed: Jun. 18, 1990

Related U.S. Application Data

[63] Continuation of Ser. No. 300,071, Jan. 19, 1989, abandoned.

[30] Foreign Application Priority Data

Jan. 25, 1988 [NO] Norway ................................ 880288

[51] Int. Cl.$^5$ ................................................ B23K 9/00

[52] U.S. Cl. .......................... 219/121.52; 219/121.48; 219/121.5; 219/121.36; 219/119

[58] Field of Search ........... 219/119, 75, 118, 121.52, 219/121.48, 121.5, 121.49, 121.59, 121.36, 72, 74; 313/231.31, 231.41; 315/111.21, 111.31; 373/18-22

[56] References Cited

U.S. PATENT DOCUMENTS

| | | | |
|---|---|---|---|
| 3,811,029 | 5/1974 | Averyanov et al. | 219/121.37 |
| 3,995,100 | 11/1976 | Jaeger | 373/21 |
| 4,017,672 | 4/1977 | Paton | 373/21 |
| 4,112,246 | 9/1978 | Lakomsky et al. | 373/21 |
| 4,133,987 | 1/1979 | Lakomsky et al. | 219/121.32 |
| 4,152,532 | 5/1979 | Eguchi et al. | 373/22 |
| 4,710,607 | 12/1987 | Wilhelm et al. | 373/22 |
| 4,734,551 | 3/1988 | Cheek | 219/121.52 |

FOREIGN PATENT DOCUMENTS

| | | | |
|---|---|---|---|
| 0020845 | 1/1981 | European Pat. Off. | 219/121.5 |
| 0202352 | 5/1985 | European Pat. Off. | |
| 0157104 | 10/1985 | European Pat. Off. | |
| 1468879 | 10/1967 | France | |
| 2217902 | 12/1977 | France | |
| 0039872 | 8/1982 | Japan | 219/121.5 |
| 900974 | 7/1962 | United Kingdom | |

*Primary Examiner*—Mark H. Paschall
*Attorney, Agent, or Firm*—Lucas and Just

[57] ABSTRACT

The present invention relates to a plasma torch intended for being submerged into a bath of molten metal, such as for example a steel melt. The torch comprises an outer electrode made from a non-consumable material and an inner electrode, where at least the outer electrode is made from a copper pipe having internal channels for circulation of a cooling medium, said copper pipe at least on the outside having a layer of refractory material.

The layer of refractory material has a thickness between 1 and 5 mm and is made from $Al_2O_3$ or from $ZrO_2$ stabilized with 5-25% by weight of MgO and/or $Y_2O_3$ or oxides of other rare earth elements.

20 Claims, 2 Drawing Sheets

SUBMERSIBLE PLASMA TORCH

Figure 1:
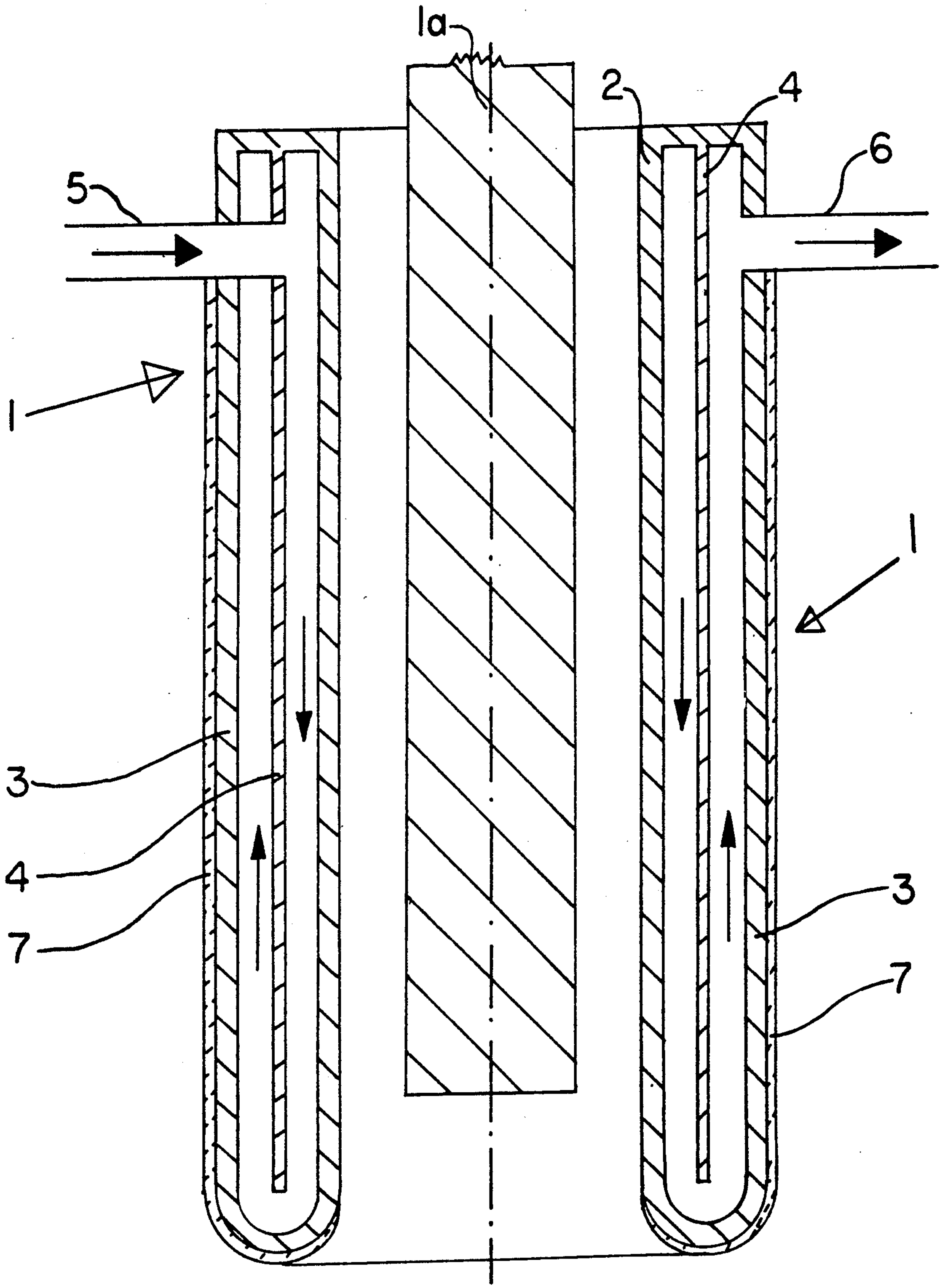

This is a continuation of application Ser. No. 300,071, filed Jan. 19, 1989, now abandoned.

The present invention relates to a plasma torch for generating a high temperature plasma by means of an electric arc between a non-consumable, ring shaped outer electrode and an inner electrode coaxially arranged in the outer ring-shaped electrode. More specifically the present invention relates to a plasma torch of the above kind which are intended to be submerged in molten metal such as a bath of molten steel.

Plasma torches which are intended to be submerged in molten metal where the electrodes are made from a comsumable material such as e.g. graphite are known. This known plasma torch has, however, a number of drawbacks and disadvantages. Breakage of the graphite electrodes happens quite frequently, which disputes the heating of the metal melt. Graphite electrodes can not be used in connection with metal melts in which graphite dissolves, such as f.ex. steel melts, melts of ferromanganese etc. Further, the plasma torch has to be equipped with means for feeding of the graphite electrodes as these are consumed. This makes the design of the plasma torch complex. Finally the consumption of graphite electrode is a main factor which leads to high operating costs for this kind of plasma torch.

It is an object of the present invention to provide a plasma torch of the above mentioned kind where at least the outer electrode is made from a non-consumable material, which plasma torch can be used for heating a molten metal bath by submerging the plasma torch into the metal bath.

Accordingly, the present invention relates to a plasma torch for generating a high-temperature plasma by means of an electric arc struck between an outer ring-shaped electrode made from a non-consumable material and an inner electrode coaxially inserted in the outer ring-shaped electrode, wherein the outer electrode comprises a copper pipe equipped with internal channels for transport of a cooling medium, the copper pipe at least on its outside having a layer of refractory material.

According to a preferred embodiment of the present invention the layer of refractory material consists of $Al_2O_3$ or $ZrO_2$ stabilized with 5–25%, preferably 20% MgO and/or $Y_2O_3$ or of oxides of other rare earth elements. The layer of refractory material has a thickness of 1-5 mm, preferably 2–4 mm and is made by flame- or plasma spraying.

The inner electrode may consist of a cooled or non-cooled copper pipe or of a consumable material, e.g. graphite. The current supply to the electrodes is preferably arranged in such a way that the arc will rotate about the tip of the outer electrode.

According to a further embodiment of the present invention there is arranged a pipe made from a ceramic material such as aluminium oxide, on the outside and at a distance from the outer ring-shaped electrode, which pipe is open at its lower end, whereby molten metal can flow into the annulus between the outer electrode and the pipe made from ceramic material.

An oil or a molten metal having a low melting temperature, is preferably used as cooling medium for cooling of the outer electrode made from copper.

In operation a gas is supplied to the annulus between the outer and the inner electrode and an electric arc is struck between the electrode tips.

The plasma torch according to the present invention can further be equipped with means which makes it possible to supply alloying additions to the metal melts through the annulus between the inner and the outer electrode.

The thermal insulating layer of refractory material on the outside of the outer electrode has a number of functions. Firstly, the copper pipe is protected against thermal and chemical stress when the torch is submerged in the molten bath. The lifetime for the outer electrode is thereby substantially increased. Secondly, the layer on the outer electrode acts as a thermal barrier between the molten metal and the copper pipe, whereby heat which is removed from the melt by the internal cooling of the copper pipe is substantially reduced. Thus the thermal efficiency of the torch is increased. For a plasma torch with an outer electrode made from cooled copper pipe without an outer layer, the heat loss from the metal bath through the copper pipe and through the cooling medium will be substantial and would reduce the thermal efficiency of the plasma torch.

The inside of the outer electrode and the inner electrode is cooled by the gas which is supplied to the plasma torch and it is therefore normally not necessary to have a layer of refractory material on these parts.

By arranging a ceramic tube on the outside of, and at a distance from the outer ring-shaped electrode, an increased protection of the plasma torch is obtained. When the plasma torch equipped with such a ceramic tube is submerged into a metal bath, molten metal will flow into the annulus between the outer electrode and the ceramic tube. The molten metal in this annulus will be more or less at rest and will protect the outer electrode.

Figure 2:
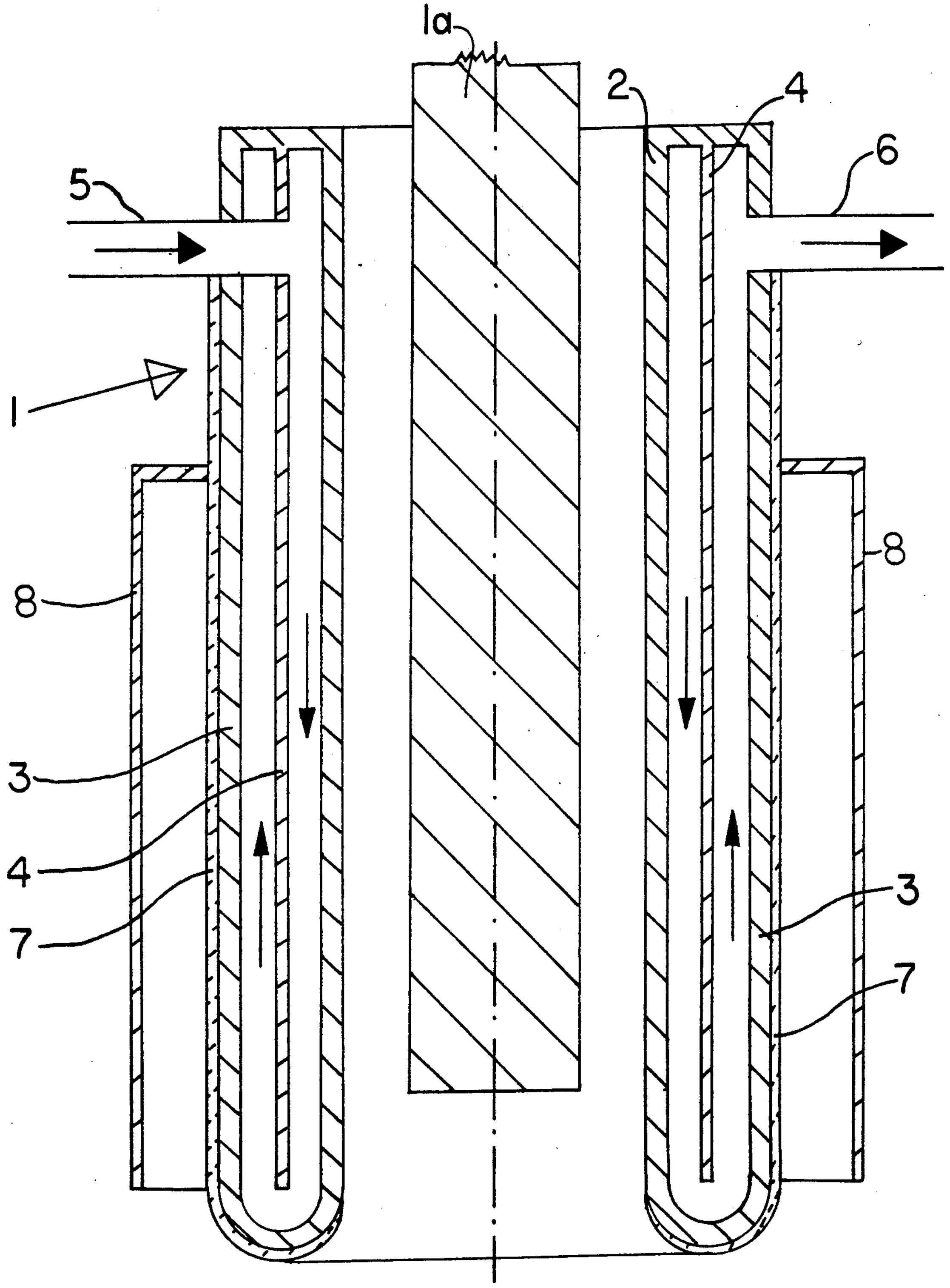

Two embodiments of the plasma torch according to the present invention will now be further described with reference to the accompanying drawings, wherein, FIG. 1, shows a vertical view through a plasma torch according to the present invention, and FIG. 2 shows a vertical view through a second embodiment of the plasma torch according to the present invention, where the outer electrode is surrounded by a ceramic tube.

The plasma torch shown on FIG. 1 comprises an outer electrode 1 and an inner electrode la. The outer electrode 1 consists of a ring-shaped copper pipe having an inner wall 2 and an outer wall 3. The copper pipe is equipped with an internal wall 4 which extends from the top of the pipe and downwards and stops a distance above the bottom of the copper pipe. The copper pipe is further equipped with an inlet opening 5 and an outlet opening 6 for a liquid cooling medium. The copper pipe has on its outer wall 3 a layer 7 of refractory material. The layer of refractory material has preferably a thickness of 1–5 mm and is made from $Al_2O_3$ or from $ZrO_2$ stabilized with 5–25% MgO and/or $Y_2O_3$ and is made by flame- or plasma spraying. On the lower end of the copper pipe there is preferably arranged inserts made from wolfram, graphite or another high-temperature resistant material having a low electric resistivity. Due to the electric arc the inserts on the lower end of the copper pipe will be worn and have to be replaced from time to time.

The plasma torch has conventional means for supply of electric current to the torch (not shown). Further, the plasma torch is equipped with means for supply of a gas such as for example argon to the annulus between the inner and the outer electrode.

On FIG. 2 there is shown a second embodiment of a plasma torch according to the present invention, where the plasma torch is equipped with a ceramic tube 8 arranged about and at a distance from the outer ring-shaped electrode. The tube 8 is open at its lower end and is at its upper end, affixed to the outside of the outer electrode. The length of the ceramic tube 8 is such that the tube at least extends upwards to a level which is above the top of the metal bath when the plasma torch is submerged in the bath.

When the plasma torch is submerged in a metal bath, molten metal will fill the annulus between the outer electrode 1 and the ceramic tube 8. As long as the torch is submerged the metal in the annulus between the outer electrode 1 and the ceramic tube will more or less be at rest. This part of the molten metal will thus protect the outside of the outer electrode against continuous flow of hot molten metal near the outside of the outer electrode. The heat stress on the layer of refractory material and on the copper pipe will thereby be reduced and the life-time of the plasma torch will be increased.

What is claimed:

1. A submersible plasma torch for use in a bath of molten metal comprising:

a) a non-consumable, ring shaped, outer electrode (1), said outer electrode having a cooling means for cooling the outer electrode with a liquid cooling medium, said cooling means positioned in said outer electrode, said outer electrode made of copper and said outer electrode having a layer (7) of refractory material affixed to the outside of said outer electrode, said layer of refractory material protecting said electrode when said electrode is immersed in the molten bath; and b) an inner electrode (1*a*) positioned coaxially inside said outer electrode for generating a continuous electric arc between the outer and inner electrodes during immersion in the molten bath.

2. Plasma torch according to claim 1, wherein the layer (7) has a thickness between 1 and 5 mm.

3. Plasma torch according to claim 1 or 2, wherein the layer (7) consists of $Al_2O_3$ which has been applied by plasma spraying.

4. Plasma torch according to claim 3, wherein a pipe (8) made from a ceramic material is arranged on the outside and at a distance from the outer electrode (1).

5. Plasma torch according to claim 4, wherein the ceramic tube (8) is made from aluminium oxide.

6. Plasma torch according to claim 5, wherein the inner electrode (1*a*) is made from copper having internal channels for circulation of a cooling medium.

7. Plasma torch according to claim 2 wherein the layer (7) consists of $Al_2O_3$ which has been applied by plasma spraying.

8. Plasma torch according to claim 2 wherein the layer (7) has a thickness between 2 and 4 mm.

9. Plasma torch according to claim 1 or 2, wherein said layer of refractor material consists of $ZrO_2$ stabilized with 5-25% of one or more of the stabilizing materials selected from the group consisting of MgO, $Y_2O_3$ and other oxides of rare earth elements, said layer of refractory material applied to the outside of said outer electrode by means of plasma spraying.

10. Plasma torch according to claim 5 wherein the inner electrode (1*a*) is made from graphite.

11. A submersible plasma torch for use in a bath of molten metal comprising:

a) a non-consumable, ring-shaped, outer electrode (1), said outer electrode having a cooling means for cooling the outer electrode with a liquid cooling medium, said cooling means positioned in said outer electrode, said outer electrode made of copper and said outer electrode having a layer (7) of refractory material affixed to the outside of said outer electrode;

b) an upper electrode (1*a*) positioned coaxially inside said outer electrode for generating a continuous electric arc between the outer and inner electrodes during immersion in the molten bath; and c) a pipe (8) made from a ceramic material, said pipe (8) affixed on the outside of said outer electrode and at a distance from the outer electrode (1).

12. Plasma torch according to claim 11 wherein pipe (8) is made from aluminum oxide.

13. Plasma torch according to claim 12 wherein the inner electrode (1*a*) is made from copper having internal channels for circulation of a cooling medium.

14. Plasma torch according to claim 13 wherein the inner electrode (1*a*) is made from graphite.

15. Plasma torch according to claim 11 wherein the layer (7) has a thickness between 1 and 5 mm.

16. Plasma torch according to claim 11 wherein the layer (7) consists of $Al_2O_3$ which has been applied by plasma spraying.

17. Plasma torch according to claim 11 wherein said layer of refractory material consists of $ZrO_2$ stabilized with 5-25% of one or more of the stabilized material selected from the group consisting of MgO, $Y_2O_3$ and other oxides of rare earth elements, said layer of refractory material applied to the outside of said outer electrode by means of plasma spraying.

18. Plasma torch according to claim 14 wherein the layer (7) consists of $Al_2O_3$ which has been applied by plasma spraying.

19. Plasma torch according to claim 14 wherein the layer (7) has a thickness between 2 and 4 mm.

20. Plasma torch according to claim 14 wherein said layer of refractory material consists of $ZrO_2$ stabilized with 5-25% of one or more of the stabilized materials selected from the group consisting of MgO, $Y_2O_3$ and other oxides of rare earth elements, said layer of refractory material applied to the outside of said outer electrode by means of plasma spraying.

* * * * *

UNITED STATES PATENT AND TRADEMARK OFFICE

CERTIFICATE OF CORRECTION

PATENT NO. : 5,103,072

DATED : April 7, 1992

INVENTOR(S) : Inger J. Eikeland et al.

It is certified that error appears in the above-identified patent and that said Letters Patent is hereby corrected as shown below:

Column 1, line 19, change "disputes" to --disrupts--.

Column 1, line 22, change "f.ex." to --e.g.--.

Column 3, line 46, delete "or 2".

Column 3, line 53, change "ceramic tube" to --pipe--.

Column 4, line 4, change "refractor" to --refractory--.

Column 4, line 22, change "upper" to --inner--.

Signed and Sealed this

Second Day of November, 1993

Attest:

Bruce Lehman

BRUCE LEHMAN

*Attesting Officer* *Commissioner of Patents and Trademarks*